April 3, 1962 — E. W. ZEARFOSS, JR — 3,028,464
CONTROL MEANS
Filed Dec. 5, 1960

INVENTOR.
ELMER W. ZEARFOSS, JR.
BY Harry W. Hargis III
AGENT

April 3, 1962 E. W. ZEARFOSS, JR 3,028,464
CONTROL MEANS

Filed Dec. 5, 1960 2 Sheets-Sheet 2

INVENTOR.
ELMER W. ZEARFOSS JR
BY
Harry W. Hargis III
AGENT

United States Patent Office 3,028,464
Patented Apr. 3, 1962

3,028,464
CONTROL MEANS
Elmer W. Zearfoss, Jr., Philadelphia, Pa., assignor, by mesne assignments, to Philco Corporation, Philadelphia, Pa., a corporation of Delaware
Filed Dec. 5, 1960, Ser. No. 73,899
15 Claims. (Cl. 200—141)

This invention relates to thermostatic temperature control means, and particularly to control means of the type comprising expansible and conducting fluids, wherein changes in volume of the expansible fluid cause the conducting fluid to modify electrical circuit means associated therewith. While of broader applicability, the present invention has particular utility in the field of refrigeration.

In thermostats of the type wherein an electrically conductive fluid is arranged to move in standpipe means, for example either to close a gap between a pair of electrical contact means when it reaches a predetermined high level or to open the gap when the fluid level recedes from such level, it is important to provide accurate temperature responsive or sensing means operative to effect the desired movements of the conductive fluid. Such sensing means have been known to comprise expansible fluids confined in the same chamber or container as the conductive fluid and operative to force the latter alternately into or out of engagement with electrical contact means, as hereinabove described. Sensing means of this type requires a sufficient area of interface between the fluids to transmit the forces while using a minimum quantity of expansible fluid to lessen thermal lag due to the mass of this fluid. It is also desirable, for example in liquid powered sensing elements, to minimize the effects of entrapped gaseous matter tending to alter the calibration of the sensing elements.

It is therefore a broad objective of the invention to provide an improved fluid actuated thermostat affording the foregoing as well as other desired characteristics.

It is another objective of the invention to provide a thermostatic device that is both highly accurate and simple in construction.

It is still another objective of the invention to provide liquid actuated thermostatic means wherein presence of gas in the pressure chamber is not detrimental to operation of the thermostatic means.

In the achievement of the foregoing and other objectives the invention contemplates, in a preferred embodiment thereof, provision of a thermostat for making and breaking electrical contact means, comprising: a chamber; partition means dividing said chamber into a pair of portions; means preferably including said partition means and defining passage means between said chamber portions; hollow stem means extending through said partition means and into each said chamber portion; an electrically conductive fluid within one of said chamber portions and extending into said stem means; an electrically non-conductive fluid expansible upon congealing disposed in one chamber portion and extending into said passage means, said non-conductive fluid, upon congealing, being effective to seal said passage means to maintain said fluids in said one chamber and expansible to exert a force upon said conductive fluid to cause it to move within said hollow stem; and switch contact means disposed for opening and closing by said conductive fluid as it moves within said hollow stem.

It is contemplated by the invention that the electrical contact means may be so arranged as either to complete or interrupt an electrical circuit upon movements of the conductive fluid.

It is a feature of the invention that the volume of the chamber portion to one side of the partition means is of sufficient magnitude to receive and store any excess expansible fluid, as may flow therein through the inter-connecting passage means, and need not be completely filled with this fluid, for freezing of fluid in the passage means automaticaly seals off a predetermined, fixed, gas-free volume of expansible fluid in the other chamber portion.

The foregoing as well as additional important features and advantages of the invention will be more fully understood by making reference to the following description taken in light of the accompanying drawing, in which:

FIGURE 6 is similar to FIGURE 2 and shows a modified embodiment of the invention;

FIGURES 7 and 8 are similar to FIGURE 6, and illustrate operational features of the modified embodiment;

Figure 4:
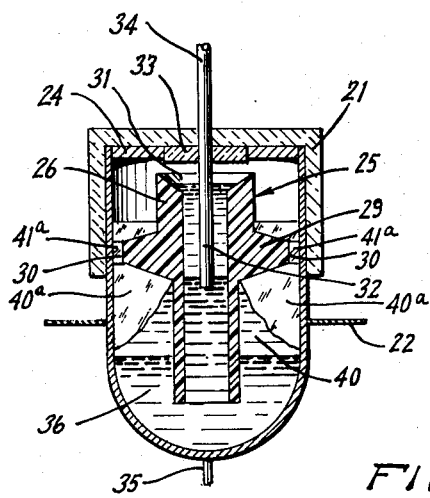
FIGURES 4 and 5 are similar to FIGURE 2, and illustrate operational features of the invention.
Figure 5:
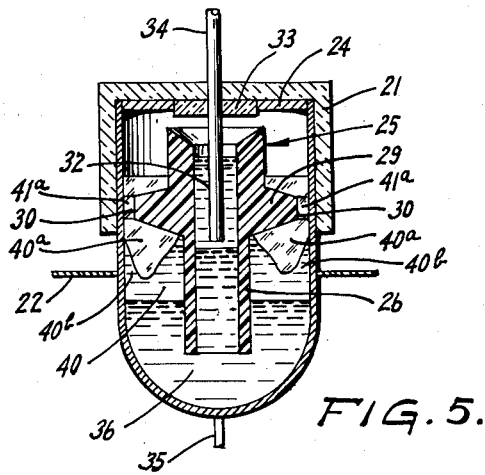

FIGURES 9 and 10 are similar to FIGURES 4 and 5 and show modifications in the switching arrangement contemplated by the invention; and FIGURES 11 and 12 are similar also to FIGURES 4 and 5 and show still other modified switching arrangements.

Figure 1:
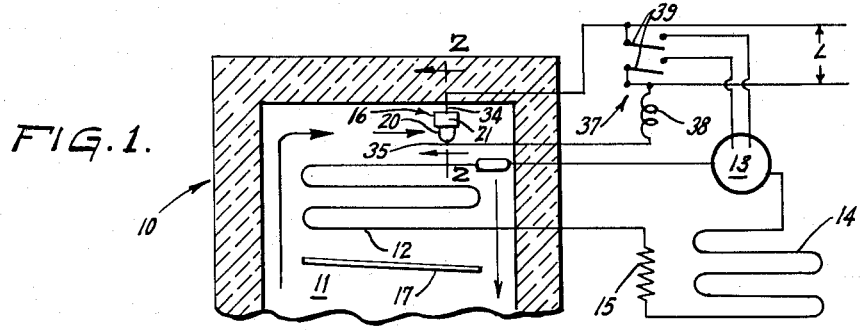
FIGURE 1 is a somewhat diagrammatic showing of refrigeration apparatus embodying the invention.

Now making more detailed reference to the drawing, and first to FIGURE 1 thereof, refrigeration apparatus of a type with which the present invention has particular utility comprises an insulated cabinet 10 provided with a storage compartment 11 and a refrigerating coil 12 to cool the compartment. Coil 12 is a conventional evaporator and is disposed in a closed refrigerant circuit comprising a motor-compressor 13, condenser 14, restrictive capillary tube 15, and the usual interconnecting conduits which need not be identified. A thermostat 16 is disposed within the compartment 11 and in series electrical circuitry with line L and solenoid coil 38 of relay means 37 which is provided to reverse the contact action of the thermostat. Relay means includes normally closed switches 39, which for convenience are shown opened, in series electrical circuitry with motor-compressor 13 and line L which supplies the power to run the same. It will be understood, however, that the invention contemplates direct contact action of the thermostat, eliminating need for a relay, as will hereinafter be more fully described.

Figure 2:
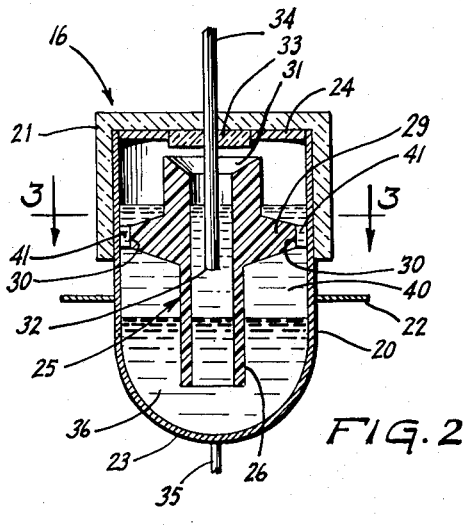
FIGURE 2 is a sectional showing of apparatus made in accordance with the invention, the view being taken generally in the plane indicated by arrows 2—2 as applied to FIGURE 1.
Figure 3:
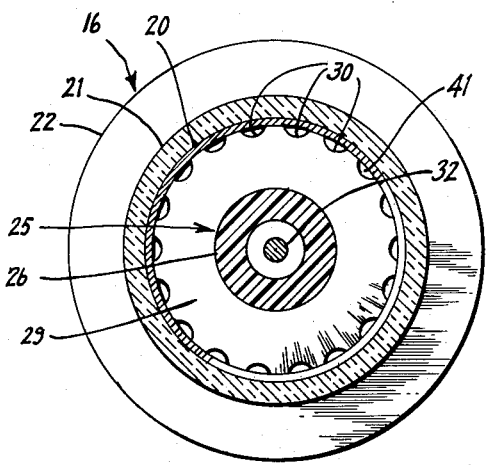
FIGURE 3 is an enlarged sectional showing looking in the direction of arrows 3—3 as applied to FIGURE 2.

While thermostat 16 is shown as being within the compartment to be cooled and adapted to control operation of compressor 13, it is to be understood that it may be disposed in suitable electrical circuitry for controlling a fan (not shown) adapted to effect air flow over the thermostat and evaporator coil 12. With further reference to FIGURES 2 and 3, it will be seen that thermostat 16 comprises a main body portion or chamber 20 partially encased by an insulating cover 21 and having a heat transfer fin 22 extending therefrom and into heat exchange relation with air being caused to flow thermosyphonically within compartment 11 with the aid of a sloping baffle 17.

In particular accordance with the invention, chamber 20 is of electrically conductive, hollow cylindrical construction, having a generally spherical bottom 23 and a flat top 24 to close the same and forming a container. Disposed within chamber 20 is a core-like member 25 comprising a conduit or hollow, open ended stem means 26 extending upwardly from the region of the lower portion of the spherical bottom 23 to the region of top 24. A plug-like, annular collar 29 is disposed about stem means 26, being formed integrally therewith and extending radially therefrom, and forms a partition that divides chamber 20 into upper and lower portions. Collar or partition 29 is of double conical configuration and is serrated, as seen at 30, along its peripheral portion which engages the inner surface of chamber 20 to define therewith passageways connecting the upper and lower chamber portions. The upper end of stem means 26 is preferably, although not necessarily, generally funnel shaped as seen at 31.

Electrical circuit means of the thermostat includes a contact element 32 extending downwardly into hollow stem 26, along the axis thereof, and ending at a level below the serrations 31. Contact element 32 is supported from top 24, and electrically insulated therefrom by electrically non-conductive sleeve 33 through which the contact element extends. The portion of contact element 32 extending above top 24, and exteriorly of chamber 20 of the thermostat, comprises one terminal portion of the thermostat, as seen at 34. The other terminal portion is seen at 35 and is disposed in electrical contact with the bottom portion 23 of thermostat chamber 20. Each of these terminal portions is connected to the electrical circuitry as shown in FIGURE 1. The lower portion of chamber 20 contains a highly conductive fluid 36 such, for example, as mercury. The surface of mercury 36 is normally disposed at a level below contact 32, whereas the mercury is at all times in electrical contact with terminal portion 35 through the agency of the electrically conductive chamber 20 of the thermostat.

A second fluid 40, for example water, is disposed also in the lower portion of thermostat chamber 20, "floats" upon the mercury, and extends through serrations 30 to assume a surface level in the upper portion of chamber 20 and above collar 29. It is to be understood of course that in order for the thermostat to function properly and in accordance with the invention, as will be hereinafter more fully described, it must be disposed in a generally vertical position as shown in the drawings. However, it will be appreciated that in the course of handling the thermostat prior to installation it can be turned in any position, inasmuch as any mercury or excess of expansible fluid escaping to the upper body portion will gravitate to the lower portion through the serrations upon placing of the thermostat in its vertical position. Also, fluid gravitating to the lower portion advantageously will force any gaseous matter therefrom and into the upper body portion.

Considering now the operation of the thermostat, and with reference first to FIGURE 4 of the drawing, refrigerating the media surrounding the thermostat chamber 20 to below-freezing temperature will effect initial localized freezing of water, as seen at 40a, in the region of heat exchange fin 22, and in the region of serrations 30 due in part to the relatively small mass of the interconnecting bodies of water in this region, and finally a substantial portion of the main body of water will freeze. The small bodies of water are designated generally by the numeral 41 (FIGURES 2 and 3), which bodies when frozen, as indicated at 41a, effectively seal the mass of water between annular collar 29 and the surface of mercury 36. Freezing of the main body of water 40 causes it to expand against the surface of the mercury, since there is no other relief for expansion due to the freezing of small bodies 41a, and to force the same upwardly within hollow stem 26. As the mercury is forced upwardly it engages contact 32 to complete the electrical circuit between terminal portions 34 and 35 of the thermostat, whereby relay coil 38 is energized and switch 39 opened to deenergize motor-compressor 13. The refrigerating effect of the evaporator coil 12 is then halted whereupon heat will flow back into the thermostat 16 and partially melt the frozen water 40a, as designated generally by numeral 40b in FIGURE 5. Melting in the small area 40b is enhanced by the fin 22, which localizes heat flow into such area, in combination with insulating cover 21 which extends over the area of serrations 30 and substantially prevents inflow of heat to such area to thaw ice therein. As the ice melts the pressure upon the mercury is released and the latter returns to substantially the position shown in FIGURE 5. In so doing the level of mercury drops below contact 32 and breaks the electrical circuit to relay coil 38. Relay switches 39 then close and the motor-compressor again starts running to cool compartment 11.

Once thermostat 16 is "frozen in," as shown in FIGURE 4, it will, when employed in a below freezing environment, cycle between the conditions shown in FIGURE 4 and the conditions shown in FIGURE 5. By cycling between these conditions the thermostat advantageously affords a concise, relatively narrow range of temperature values over which it is responsive to make and break an electrical circuit. However the thermostat may be employed under such a wide differential temperature condition where it may cycle between conditions as seen in FIGURES 2 and 4.

A modified embodiment of the invention is shown in FIGURE 6, with operational features thereof being shown in FIGURES 7 and 8, wherein a thermostat 45 includes an electrically conductive, hollow cylindrical body portion or chamber 46 having a top 50 and a generally spherical bottom 51. A core-like member 52 comprising hollow, open ended stem means 53 is disposed within the chamber 46 and extends vertically, as shown, to within short distances of the top and bottom of the latter. Stem means 53 further includes a generally annular collar or plug 54, provided with opposed upper and lower grooves 55 and 56, respectively, each groove being substantially V-shaped in cross section. A plurality of small diameter passages 60 extend between the vertices of the opposed grooves 55 and 56, being spaced inwardly from the walls of chamber 46. It is therefore seen that while collar 54 substantially partitions the chamber 46 into a pair of chamber portions, the small passages 60 connect these portions in the same manner as serrations 30 connect the upper and lower chamber portions of the embodiment hereinbefore described. Note that in both embodiments surfaces of the collar slope toward the interconnecting small passages. This ensures complete drainage of mercury to the lower chamber portion in the event the thermostat is inverted prior to installation in the required vertical position. Also, by displacing the passages 60 inwardly, the outer portion of insulative collar 54 serves in the same capacity as insulative cover 21 of the embodiment shown in FIGURES 2 to 5, that is to retard the flow of heat into the small masses of ice in the passages 60. It will be appreciated also that in the foregoing as well as in any of the other embodiments the flow of heat into and out of the finned area may be further controlled by thermally insulating the housing or body in the region of its lower, spherical portion.

A contact element 61 extends downwardly into hollow stem 53, along the axis thereof, and ends at a level below passages 60. Contact element 61 is supported by insulator 62 disposed in top wall 50. The outwardly extending portion 63 of the contact element comprises one terminal of the thermostat. The other terminal of the thermostat is seen at 64 and is disposed in electrical contact with the bottom portion 51 of thermostat chamber 46. Each of these terminals is adapted for connecting in electrical circuitry in the manner of the embodiment shown in FIGURE 1.

Just as in the embodiment shown in FIGURES 1 to 5, the portion of chamber 46 below collar 54 contains mercury 65 substantially to the level shown and electrically connected to terminal 64. Also, water 66 is disposed within the lower chamber portion, atop the mercury, and extends upwardly into and through passages 60 to the level shown.

Considering now the operation of this embodiment, and with particular reference to FIGURES 7 and 8, refrigerating the media surrounding the thermostat body 46 initially will effect freezing of the water as seen at 66a (FIGURE 7) both within passages 60 and below collar 54. Freezing of the water in passages 60 effectively seals the water between collar 54 and the mercury, and the expansive force created by the water as it freezes is directed downwardly against the mercury. This force causes the mercury to rise in the hollow stem 53 until it makes contact with contact element 61. This completes the electrical circuit, and as in the embodiment shown in FIGURE 1, halts operation of the refrigerating means. With particular reference to FIGURE 8, as the temperature rises due to lack of cooling, the body of frozen water 66 partially melts as seen at 66b, in an amount sufficient to contract, thereby releasing pressure upon the mercury 65 and allowing the column within hollow stem 53 to drop and disengage contact element 61. This breaks the electrical circuit through the thermostat and again initiates operation of the refrigerating means to effect refreezing of water 66 in accordance with the showing of FIGURE 7. The thermostat therefore alternates between the conditions shown in FIGURES 7 and 8, thereby effecting cyclic operation of the refrigerating means.

In the foregoing, as well as any of the embodiments to be hereinafter described, sensitivity of the thermostat may be varied by modifying the relative cross-sectional areas of the stem and body portions.

Considering further that the invention contemplates modification of the thermostat switching function whereby direct switching action is achieved, attention is directed to somewhat diagrammatic FIGURES 9 and 10 where it will be seen that freezing of an expansible fluid 70 can be made to effect parting of the column of mercury 71 (FIGURE 9), due to depression of the mercury level in the region of the lower end of the stem, whereby a "slug" of water 70b breaks the mercury column and the electrical circuit between terminals 72 and 73 is opened. In the arrangement shown operation of a motor compressor 74, disposed in series with the terminals 72, 73 and line L, is halted. As the body of frozen fluid 70 warms up, due to lack of cooling by the idle compressor, it will partially melt as seen at 70a and contract sufficiently to allow the parted column of mercury 71 to again fuse (FIGURE 10) and complete the electrical circuit for compressor 74. The control will then cycle between conditions shown in FIGURES 9 and 10 to effect cyclic operation of compressor 74.

With reference to FIGURES 11 and 12 it is seen that direct switching also may be attained by disposing the lower terminal 75 as shown. Also, terminal 75 is insulated by non conductive seal 76 and extends into mercury 77 in FIGURE 12. As expansible fluid 78 freezes (FIGURE 11), the main body of mercury 77 is forced downwardly and out of electrical engagement with terminal 75. As a portion of fluid 78 melts, as seen at 78a (FIGURE 12), the main body of mercury rises, due to contraction of the thawing fluid, and contact is again made with terminal 75. Under either of the conditions shown in this latter embodiment the upper terminal 79 is in contact with the mercury 77.

In any of the illustrated embodiments water has been indicated to be the preferred expansible fluid, inasmuch as it is known to exhibit an advantageous 8 to 9 percent volume change during freezing. In the event it is desired to modify the temperature range over which the thermostat operates, other water-base solutions may be resorted to. For example, solutions of alcohol in water as the expansible fluid may provide desired calibration values lower than 32° F., which solutions do not depart appreciably from the desirable expansion characteristics of the water. Irrespective of the particular expansible fluid selected, the invention affords simple and effective means for ensuring a predetermined uniform volume of expansible fluid that is free of entrapped gases.

While certain preferred embodiments of the invention have been shown, for the purposes of illustration, it will be understood that such other modifications may be made as fall within the scope of the appended claims.

I claim:

1. Thermostatic switch apparatus comprising: a chamber; partition means dividing said chamber into a pair of portions; means including said partition means and defining passage means between said chamber portions; hollow stem means extending through said partition means and communicating with each said chamber portion; an electrically conductive fluid within one of said chamber portions and extending into said stem means; an electrically non-conductive fluid, expansible upon congealing, disposed in one chamber portion and extending into said passage means, said non-conductive fluid, upon congealing, being effective to seal said passage means and expansible to exert a force upon said conductive fluid to cause it to move within said hollow stem means; and switch contact means disposed for opening and closing by said conductive fluid as it moves within said hollow stem means.

2. In thermostatic switch means of the type including an electrically conductive fluid, switch contact elements operatively associated with said conductive fluid, an electrically non-conductive fluid expansible upon congealing, and means for confining said fluids whereby said expansible fluid is disposed and adapted, upon such expansion, to exert a force upon said conductive fluid to modify an electrical circuit between such contact elements, said means for confining comprising: a chamber; partition means dividing said chamber into a pair of portions; and means including said partition means defining passage means between said chamber portions, said fluids being disposed in one of said chamber portions and the non-conductive fluid extending into said passage means, the construction and arrangement being such that upon congealing said non-conductive fluid seals said passage means to maintain said fluids in said one chamber portion.

3. A thermostatic switch comprising: container means; hollow, open ended stem means disposed within said container means; means defining a partition separating said container means into a pair of chambers; means including said partition means defining passage means interconnecting said pair of chambers; an electrically conductive fluid partially filling one of said chambers and said hollow stem means; congealable fluid filling said one chamber, adjacent said conductive fluid and extending through said passage means, said congealable fluid, upon initial congealing, being adapted to seal said passage means to confine expansible fluid within said one chamber, and being expansible, in response to continued congealing to exert pressure against said conductive fluid in said one chamber to cause the latter to move in said hollow stem means; and electrical contact means so associated with said conductive fluid as to control an electrical circuit connected thereto, in response to movement of the conductive fluid within the hollow stem means.

4. A thermostatic switch according to claim 3 characterized in that said container means comprises a hollow, upright cylinder having a generally spherical bottom.

5. A thermostatic switch according to claim 3 characterized in that said partition means is of thermally non-conductive material and said container means is of thermally conductive material.

6. A thermostatic switch according to claim 3 characterized in that said electrical contact means comprise: a first contact element extending into said stem means, adapted for contact with the conductive fluid therein, and having a terminal portion disposed outside said container means; and a second contact element including a terminal portion disposed outside said container means and a portion adapted for contact with the conductive fluid in said one chamber.

7. A thermostatic switch according to claim 6 wherein said container means is of thermally conductive material and said second electrical contact terminal portion is in direct electrical contact with said container means.

8. A thermostatic switch according to claim 4 characterized in that said partition means comprises a plug element inserted into said hollow cylinder.

9. A thermostatic switch according to claim 8 characterized in that said passage means is defined by serrations formed in said plug element and engaging inner wall portions of said hollow cylinder.

10. A thermostatic switch according to claim 8 characterized in that said passage means comprises orifices extending entirely through said plug element.

11. A thermostatic switch comprising: container means; an open ended conduit within said container means; means defining a partition separating said container means into an upper and a lower chamber; means including said partition defining passage means interconnecting said upper and said lower chambers; an electrically conductive fluid partially filling said lower chamber and said conduit; congealable fluid filling said lower chamber above said conductive fluid and extending into said passage means, said fluid, upon initial congealing, being adapted to seal said passage means to maintain expansible fluid within said lower chamber and expansible, in response to continued congealing, against said conductive fluid in said lower chamber, to cause the latter fluid to rise in said conduit; and electrical contact means so associated with said conductive fluid as to control an electrical circuit connected thereto, in response to movements of the conductive fluid within said conduit.

12. A thermostatic switch comprising: container means; a hollow, open ended stem extending vertically within said container means and including a collar having its peripheral portion in close engagement with the interior wall surface of said container means, said collar substantially dividing said container means into a pair of chambers; passage means extending through said collar and connecting said pair of chambers; a body of electrically conductive fluid in said lower chamber and having its surface level below said collar, a portion of said conductive fluid extending into said stem; an electrically non-conductive fluid, adapted to expand upon freezing, disposed in said container means above said conductive fluid and having portions extending into said passage means, said expansible fluid being adapted, upon freezing, to seal said passage means and expansible against the conductive fluid upon such freezing to force the latter upwardly into said hollow stem; and electrical terminal means engageable with said mercury for modifying electrical circuitry associated therewith as the mercury rises and falls in said hollow stem.

13. A thermostatic switch, comprising: a sealed container; a hollow open ended stem disposed within said container and extending vertically therein; a collar disposed about said stem and having its peripheral portion disposed in close engagement with the interior wall surface of said container; said peripheral portion further having serrations formed therein; a body of electrically conductive fluid disposed in said container and having its surface level below said collar, a portion of said conductive fluid extending into said stem; an electrically nonconductive freeze-expansible fluid disposed in said container above said conductive fluid having portions extending between said serrations, said expansible fluid being adapted to freeze whereby to close the spaces between said serrations and to expand against the conductive fluid to force the same upwardly into said hollow stem; first electrical terminal means for said switch contacting said conductive fluid; and second electrical terminal means for said switch having a contact portion immersible in said conductive fluid as it rises within said column, whereby an electrical circuit between said first and second terminal means is modified.

14. A thermostatic switch comprising: a container; a hollow, open ended stem disposed within said container, and having a collar disposed with its peripheral portion in close engagement with the interior wall surface of said container; means including said collar defining passage means extending through said collar; a body of electrically conductive fluid in said container below said collar and extending into said hollow stem; an electrically non-conductive, congealable and expansible fluid in said container above said conductive fluid and having portions extending into said passage means, said expansible fluid upon freezing in the region of said passage means being effective to close the latter and expansible against the conductive fluid to force the same upward in said hollow stem; first electrical terminal means for said switch contacting said conductive fluid; and second terminal means for said switch having a contact portion immersible in said conductive fluid as it rises within said column, whereby an electrical circuit is completed between said first and second terminal means.

15. In thermostatic switch means of the type including an electrically conductive fluid, switch contact elements operatively associated with said conductive fluid, a fluid expansible upon congealment, and means for containing said fluids whereby said expansible fluid is disposed and adapted upon such congealment to exert a force upon said conductive fluid to modify an electrical circuit between such contacts, said means for containing comprising: means defining a chamber; first and second conduit means disposed within said chamber, said conductive fluid extending from said chamber into said first conduit means and said congealable fluid disposed in contact with said conductive fluid and extending into said second conduit means, the construction and arrangement being such that upon congealment said expansible fluid seals said second conduit means to provide fixed structure against which the expansible fluid reacts to exert a force against said conductive fluid.

References Cited in the file of this patent
UNITED STATES PATENTS

| | | |
|---|---|---|
| 475,340 | Palmer et al. | May 24, 1892 |
| 491,580 | Milligan | Feb. 14, 1893 |
| 1,091,472 | Babendeer et al. | Mar. 31, 1914 |
| 1,795,831 | Burkholder | Mar. 10, 1931 |
| 2,138,611 | Philipp | Nov. 29, 1938 |
| 2,187,258 | Wood | Jan. 16, 1940 |
| 2,453,851 | Miller | Nov. 16, 1948 |
| 2,472,082 | Armstrong | June 7, 1949 |